Patented Sept. 3, 1929.

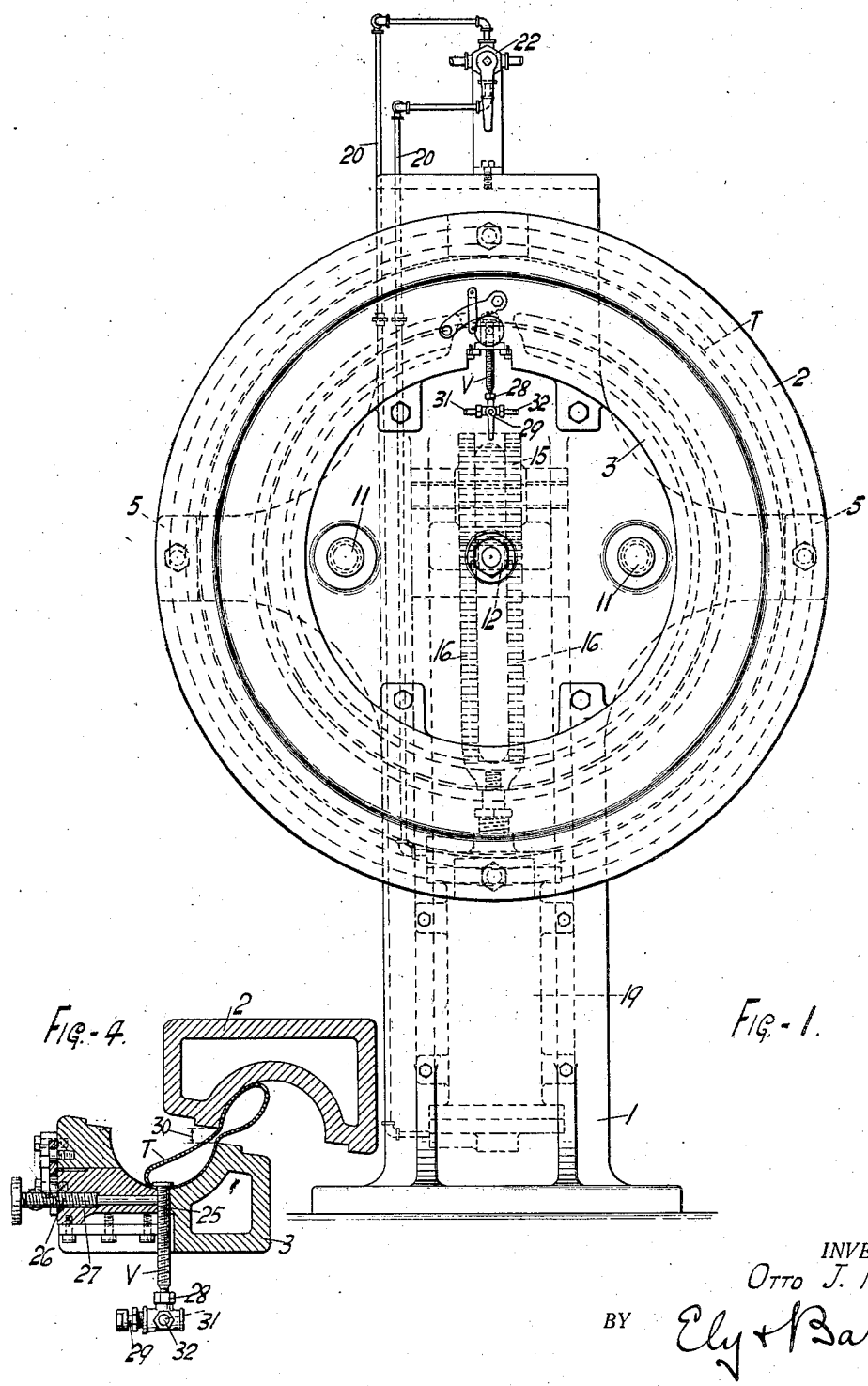

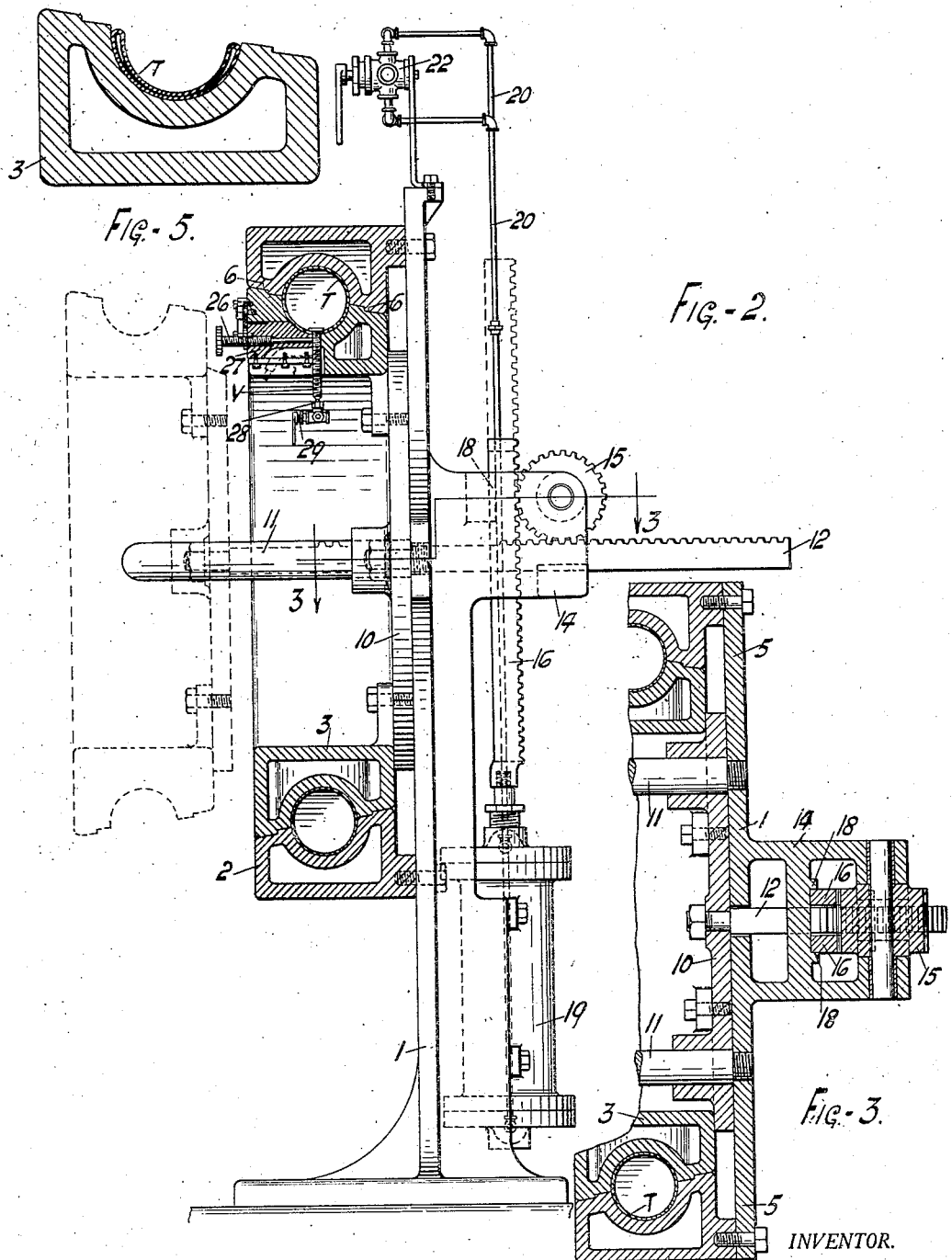

1,727,304

UNITED STATES PATENT OFFICE.

OTTO J. KUHLKE, OF AKRON, OHIO, ASSIGNOR TO THE NATIONAL RUBBER MACHINERY COMPANY, OF AKRON, OHIO, A CORPORATION OF OHIO.

APPARATUS FOR VULCANIZING INNER TUBES.

Application filed March 25, 1927. Serial No. 178,233.

This invention relates to a new and improved apparatus for the vulcanization of inner tubes, and particularly to the manufacture of tubes by vulcanizing the tube while in circular form and while the interior of the tube is subjected to internal pressure.

The especial purpose of the invention is to construct an apparatus which can be quickly and easily operated, by which the tube can be more readily and accurately placed within the vulcanizing cavity and also in which the manufacture of the tube can be carried on more economically and with improved results.

In the drawings, the preferred form of the invention is shown, but it will be understood that changes and improvements may be suggested by the disclosure herein to those skilled in this art, and it is not the purpose or intention to restrict the invention to the exact form or embodiment shown herein. The claims herein are, therefore, subject to such interpretation as is permissible within the limits of the prior art and within the scope of the invention as set forth.

In the drawings:—

Figure 1 is a front view of a complete tube vulcanizing unit constituting an embodiment of the invention;

Figure 2 is a side elevation, the tube mold being shown in section;

Figure 3 is a section on the line 3—3 of Figure 2;

Figure 4 is a sectional view showing the manner in which the mold is opened; and Figure 5 is an enlarged detail of the inner mold section with the tube in collapsed position therein.

The apparatus comprises a vertical standard or support 1, to the front face of which is attached a stationary tube mold section 2. This section is shown in the drawings as provided with a cavity which forms the outer portion of the complete tube cavity, the inner portion being formed by a corresponding cavity in the movable mold section 3. Each of these sections is chambered for the circulation of steam to supply the requisite vulcanizing temperature, the steam connections not being illustrated in the drawings. In order to securely support the section 2, the standard 1 may be provided with laterally extending arms 5 to which the section is bolted.

It will be noted that the sections 2 and 3 each contain a form one-half of the entire molding cavity for the inner tube, this being preferred, although the invention is not necessarily limited to exact division shown herein. The line or surface of division is tapered or conical as shown with the taper directed as shown, so that sufficient draft is provided to permit the separation of the two mold sections and also the tight engagement of the sections when brought together, thereby eliminating the rind or overflow to the least possible extent. At either side of the cavity the line of separation may be offset as shown at 6.

The inner or movable mold section is secured to a plate 10 which is slidably mounted upon two horizontal guiding pins 11 which are mounted in the standard 1 and project through the plate. The plate 10 is attached to the forward end of a horizontal rack bar 12 which is supported and guided in a bracket 14 projecting from the rear of the standard 1. This rack bar is in mesh with a pinion 15 also mounted in the bracket 14. The pinion is rotated by means of a vertical, double rack 16 which spans the rack 12 and is guided in ways 18 on the bracket. The rack 16 is operated by a piston in a pressure cylinder 19 secured to the rear of the standard and controlled through piping 20 from a suitable 4-way valve 22 mounted on the top of the bracket 1.

By means of the mechanism which has just been described, the inner or movable mold section 3 is moved toward and away from the stationary section 2. When a tube T is vulcanized within the mold, the section 3 is moved outwardly to the dotted line position shown in Figure 2, where the entire periphery of the mold cavity is open and unobstructed so that the operator can remove the vulcanized tube and replace it with a green or unvulcanized tube.

The valve stem V is passed through an opening 25 in the bottom of the cavity on the movable section and is clamped in position by a screw pin 26 mounted in a movable block 27. This block is so constructed that straight or bent valve stem tubes can be cured in the same apparatus, the details of this mechanism forming the subject matter of my prior application Serial No. 161,786, filed January 18, 1926.

In order to inflate the tube during the curing operations, the valve stem is connected to a coupling 28 which is provided with a valve 29 to control the flow of pressure fluid. After the tube is vulcanized, the pressure is released and the inner section is moved outwardly to the unloading and loading position. The movement of the section 3 will loosen the tube form the walls of the outer or stationary section 2 and under ordinary or usual circumstances, the tube will collapse sufficiently to permit the movement of the section 3 without danger of injury to the tube. It will be noted that the general diagonal arrangement of the cut, or the provision for the draft between the sections of the tube permits the passage of the rear face of the movable ring beyond the front face of the stationary ring with sufficient clearance so that there is no danger of puncturing the tube between the two surfaces. The spacing is indicated at 30 in Figure 4 and is slightly greater than the total thickness of the two walls of the tube. However, it may be advisable to assist the collapsing of the tube by opening the interior of the tube through the valve V to a source of vacuum or partial vacuum. For this purpose the valve 29 may be connected both to a pressure line 31 and a vacuum line 32. If vacuum is used, the atmospheric pressure upon the outside of the tube will take effect as soon as the tube is loosened from the stationary mold member and the tube will assume approximately the position shown in Figure 5, whereupon it will clear the stationary mold section.

While the invention is shown with the inner section movable, and this is preferable to permit ready access to the mold cavity, it is conceivable that the outer section might be the movable one. It is also to be observed that the surfaces which divide the inner and outer sections are not necessarily conical, but may be of any shape to provide the requisite draft between the sections, the division line, however, being preferably so located that a portion of the tube cavity at either side of the median line of the tube lies in each section of the mold.

What is claimed is:

1. A tube vulcanizer, comprising a tube mold divided into two sections, each comprising an endless ring, the division between said sections being on substantially a conical surface which passes through the center of the mold cavity, a support to which the outer mold section is rigidly attached, and a guide upon which the inner mold section is movable toward and away from the stationary section.

2. A tube vulcanizer, comprising a tube mold divided into two sections, each comprising an endless ring, the division between said sections being on substantially a conical surface which passes through the center of the mold cavity, a support to which the outer mold section is rigidly attached, a guide upon which the inner mold section is movable toward and away from the stationary section, and means to move the inner section on the guide.

3. A tube vulcanizer, comprising a tube mold composed of inner and outer ring-shaped sections, each section being provided with a portion of the tube vulcanizing cavity, a support to which the outer section is rigidly secured, and a guide upon which the inner section is movable toward and away from the outer section, the sections being divided along a surface which gives draft to the inner section.

4. A tube vulcanizer, comprising a tube mold composed of inner and outer ring-shaped sections, each section being provided with a portion of the tube vulcanizing cavity, a support to which the outer section is rigidly secured, and a guide upon which the inner section is movable toward and away from the outer section, the sections being divided along a surface which gives draft to the inner section and passes through the mold cavity exteriorly of the inner circumference of the cavity.

5. A tube vulcanizer, comprising a tube mold composed of inner and outer ring-shaped sections, each section being formed with a portion of the tube vulcanizing cavity therein, a support to which the outer section is rigidly secured, and a guide upon which the inner section is movable toward and away from the outer section, the sections being divided upon a conical surface which gives draft to the inner section and passes through the center of transverse curvature of the tube.

6. A tube vulcanizer, comprising a tube mold composed of inner and outer ring-shaped sections, each section being formed with a portion of the tube vulcanizing cavity therein, a support to which the outer section is rigidly secured, a guide upon which the inner section is movable toward and away from the outer section, the sections being divided upon a conical surface which gives draft to the inner section and passes through the center of transverse curvature of the tube, and means to cause the inner section to shift toward and away from the outer section.

7. A tube vulcanizer, comprising inner and outer ring-shaped sections, each section containing a portion of the tube molding cavity, means to shift one of the sections laterally of the other, and means to cause the tube to collapse within the cavity on the inner section.

8. A tube vulcanizer, comprising inner and outer ring-shaped sections, each section containing a portion of the tube molding cavity, means to shift one of the sections laterally of the other, and means to exert a vacuum upon the interior of the tube.

9. A tube vulcanizer, comprising inner and outer ring-shaped sections, the sections being divided along a surface which passes through the cavity so that a portion thereof lies in each section, the surface providing draft for the mold sections, and means to shift one of the sections relatively to the other.

10. A tube vulcanizer, comprising inner and outer ring-shaped sections, the sections being divided along a surface which passes through the cavity so that a portion thereof lies in each section, the surface providing draft for the mold sections, means to shift one of the sections relatively to the other, and means to cause the tube to collapse within the cavity in the inner section.

11. A tube vulcanizer, comprising inner and outer ring-shaped sections, the sections being divided along a surface which passes through the cavity so that a portion thereof lies in each section, the surface providing draft for the mold sections, means to shift one of the sections relatively to the other, and means to exert a vacuum upon the interior of the tube.

12. A tube vulcanizer, comprising a standard, a mold composed of inner and outer ring-shaped sections, the outer section being rigidly secured upon the standard, a guide projecting from the standard, the inner section being slidably mounted upon the guide, and means to move the inner section on the guide, the mold sections being provided with mating cavities on their contacting faces and being separating along a conical surface which passes through the approximate center of the tube.

13. A tube vulcanizer, comprising a standard, a mold composed of inner and outer ring-shaped sections, the outer section being rigidly secured upon the standard, a guide projecting from the standard, the inner section being slidably mounted upon the guide, and means to move the inner section on the guide, the mold sections being provided with mating cavities on their contacting faces and being separated along a surface which gives draft to permit movement of the inner section.

14. A tube vulcanizer, comprising a standard, a mold composed of inner and outer ring-shaped sections, the outer section being rigidly secured upon the standard, a guide projecting from the standard, the inner section being slidably mounted upon the guide, means to move the inner section on the guide, the mold sections being provided with mating cavities on their contacting faces and being separated along a conical surface which passes through the approximate center of the tube, and means to cause the tube to collapse within the cavity upon the inner section.

15. A tube vulcanizer, comprising a standard, a mold composed of inner and outer ring-shaped sections, the outer section being rigidly secured upon the standard, a guide projecting from the standard, the inner section being slidably mounted upon the guide, means to move the inner section on the guide, the mold sections being provided with mating cavities on their contacting faces and being separated along a surface which gives draft to permit movement of the inner section, and means to cause the tube to collapse within the cavity upon the inner section.

16. A tube vulcanizer, comprising a standard, a mold composed of inner and outer ring-shaped sections, the outer section being rigidly secured upon the standard, a guide projecting from the standard, the inner section being slidably mounted upon the guide, means to move the inner section on the guide, the mold sections being provided with mating cavities on their contacting faces and being separated along a conical surface which passes through the approximate center of the tube, and means to exert a vacuum upon the interior of the tube.

17. A tube vulcanizer, comprisng a standard, a mold composed of inner and outer ring-shaped sections, the outer section being rigidly secured upon the standard, a guide projecting from the standard, the inner section being slidably mounted upon the guide, means to move the inner section on the guide, the mold sections being provided with mating cavities on their contacting faces and being separated along a surface which gives draft to permit movement of the inner section, and means to exert a vacuum upon the interior of the tube.

18. In apparatus for vulcanizing pneumatic tubes, a mold comprising a pair of concentric cooperating sections enclosing an annular mold cavity, means to support said outer section, means to axially move said inner section to open said mold and means operable with the mold to lock a valve stem.

OTTO J. KUHLKE.